United States Patent
Ahn et al.

(10) Patent No.: US 6,532,655 B1
(45) Date of Patent: Mar. 18, 2003

(54) METHOD OF MANUFACTURING HOLLOW PISTON FOR COMPRESSORS

(75) Inventors: Hew Nam Ahn, Taejon-Si (KR); Young Seop Yoon, Taejon-Si (KR)

(73) Assignee: Halla Climate Control Corp., Taejon-Si (KR)

( * ) Notice: Subject to any disclaimer, the term of this patent is extended or adjusted under 35 U.S.C. 154(b) by 0 days.

(21) Appl. No.: 09/465,594

(22) Filed: Dec. 17, 1999

(30) Foreign Application Priority Data

Mar. 20, 1999 (KR) .............................. 99-9573
Oct. 19, 1999 (KR) .............................. 99-45395

(51) Int. Cl.[7] .................... B23P 15/10; B21K 1/18
(52) U.S. Cl. ...................... 29/888.042; 29/888.044; 29/888.048; 92/176; 228/113
(58) Field of Search ................... 22/888.042, 888.044, 22/888.048; 92/172, 175, 176, 260; 123/193.6

(56) References Cited

U.S. PATENT DOCUMENTS

| | | | |
|---|---|---|---|
| 3,609,840 A | * 10/1971 | Canady | |
| 4,191,095 A | * 3/1980 | Heyl | 92/172 |
| 4,216,704 A | * 8/1980 | Heyl | |
| 4,532,686 A | * 8/1985 | Berchem | 29/888.042 |
| 5,065,508 A | * 11/1991 | Lorento et al. | 29/888.042 |
| 5,150,517 A | * 9/1992 | Martins Leites et al. | 29/888.04 |
| 5,309,818 A | * 5/1994 | Mendes et al. | 92/176 |
| 5,359,922 A | * 11/1994 | Martins Leites et al. | 92/260 |
| 5,765,464 A | * 6/1998 | Morita | 92/172 |
| 5,934,174 A | * 8/1999 | Abraham, Sr. et al. | 123/193.6 |
| 5,960,542 A | * 10/1999 | Umemura et al. | 29/888.042 |
| 6,266,878 B1 | * 7/2001 | Durkin et al. | |
| 6,367,368 B1 | * 4/2002 | Ganster | |

FOREIGN PATENT DOCUMENTS

| | | | |
|---|---|---|---|
| DE | 2364725 | * 7/1975 | |
| EP | 0 896 854 A1 | 2/1999 | |
| EP | 0 959 227 A2 | 11/1999 | |
| JP | 4-109481 | * 8/1992 | |
| JP | 6-2613 | * 1/1994 | 123/193.6 |

* cited by examiner

Primary Examiner—Gregory M. Vidovich
Assistant Examiner—Eric Compton (57) ABSTRACT

A method of manufacturing a hollow piston for variable displacement swash plate compressors of air conditioning systems is disclosed. This method produces a desired hollow piston by separately forming a body and a cap and by simply machining the body and the cap prior to simply welding the body and the cap together into a single structure through a frictional welding process. This method thus remarkably simplifies the pre-welding machining process. In the frictional welding process, the body and the cap are welded together into a single structure by simply and relatively rotating the body and the cap while forcing them toward each other under atmospheric air at room temperature. The frictional welding process is thus accomplished using a simple welding machine, thereby reducing the equipment cost while producing the hollow pistons. The frictional welding process is also free from oxidizing the welded portions of a resulting hollow piston, and so the resulting piston does not have micro pores in its structure. The hollow pistons, produced by the method of this invention, thus have a high durability and are free from reducing the refrigerant compressing efficiency of a compressor.

9 Claims, 13 Drawing Sheets

METHOD OF MANUFACTURING HOLLOW PISTON FOR COMPRESSORS

BACKGROUND OF THE INVENTION

1. Field of the Invention

The present invention relates, in general, to a method of manufacturing a piston for variable displacement swash plate compressors of air conditioning systems and, more particularly, to a method of manufacturing a hollow piston for such compressors, the hollow piston being light enough to receive a low inertia force and being capable of improving the fluid compressing efficiency of a compressor.

2. Description of the Prior Art

As well known to those skilled in the art, a conventional compressor for air conditioning systems of automobiles selectively receives engine power transmitted from a pulley. Such a selective transmission of the engine power to the compressor is accomplished by an electromagnetic clutch. Upon receiving the engine power, the compressor compresses gas refrigerant flowing from an evaporator, thus making high temperature and high pressure gaseous refrigerant prior to feeding the refrigerant to a condenser. In such a case, the high temperature and high pressure gaseous refrigerant from the compressor is easily liquidized in the condenser.

An example of such compressors is a swash plate compressor. In a conventional swash plate compressor, a wobble plate is inclinedly mounted to a drive shaft cooperating with an engine, thus being rotated by engine power. A plurality of pistons are coupled to the outside edge of the swash plate with a shoe being interposed between the swash plate and each piston. When the swash plate is rotated by the engine power, the above pistons rectilinearly reciprocate within the bores of a cylinder, thus sucking, compressing and exhausting gaseous refrigerant.

SUMMARY OF THE INVENTION

The object of the present invention is to provide a method of manufacturing a hollow piston for variable displacement swash plate compressors of air conditioning systems, which produces a desired hollow piston by separately forming a body and a cap and by simply machining the body and the cap prior to simply welding the body and the cap together into a single structure through a frictional welding process in atmospheric air at room temperature, and which thus reduces the defective proportion of resulting pistons, remarkably reduces the production cost of the pistons due to a reduction in both the equipment cost and the processing cost, and allows the pistons from the welding process to be free from micro pores, thus improving the refrigerant compressing efficiency of a compressor.

In order to accomplish the above object, the present invention provides a method of manufacturing a hollow piston for variable displacement swash plate compressors, comprising: a forging step of separately forming a body and a cap, the body consisting of a bridge part, with a hollow cylindrical head part and a grip part being formed at both sides of the bridge part, and the cap consisting of a hollow cylindrical head part and a grip part formed at both sides thereof; a pre-welding machining step of cutting end surfaces of the head parts of both the body and the cap, thus forming junction surfaces at the end surfaces of the head parts; a frictional welding step of integrating the body and the cap into a piston member by frictionally welding the junction surfaces together while forcing the body and the cap toward each other with the body and the cap being held by jigs at their grip parts; a post-welding machining step of cutting a side surface of the piston member while holding the piston member using a jig, thus primarily forming a side surface of a piston head; a coating step of forming an abrasion resistance layer on the side surface of the piston head; a polishing step of polishing the side surface of the piston head, thus finally forming a desired side surface of the piston head; a recess cutting step of cutting the bridge part of the body of the piston member at a predetermined portion, thus forming a swash plate seating recess with a shoe pocket, the shoe pocket being formed by cutting a sidewall of the swash plate seating recess at diametrically opposite portions so as to form concave surfaces at the diametrically opposite portions; and a final cutting step of removing the grip parts from both ends of the piston member, thus forming front and rear end surfaces of a resulting piston.

In the method of this invention, a desired hollow piston is produced by separately forming a body and a cap through a die-casting process or a forging process and by simply machining the body and the cap prior to simply welding the body and the cap together into a single structure through a frictional welding process under atmospheric air at room temperature. The method of this invention thus remarkably simplifies the pre-welding machining process and welds the body and the cap together into a single structure without requiring a high processing precision different from a conventional method. Since the welding process of this invention is simplified, it is possible to reduce the defective proportion of resulting hollow pistons in addition to a reduction in both the equipment cost and the processing cost while producing the hollow pistons. This finally reduces the production cost of the hollow pistons. In addition, the frictional welding process of this invention is free from forming micro pores in the resulting pistons, and so the pistons of this invention do not reduce the refrigerant compressing efficiency of variable displacement swashplate compressors.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
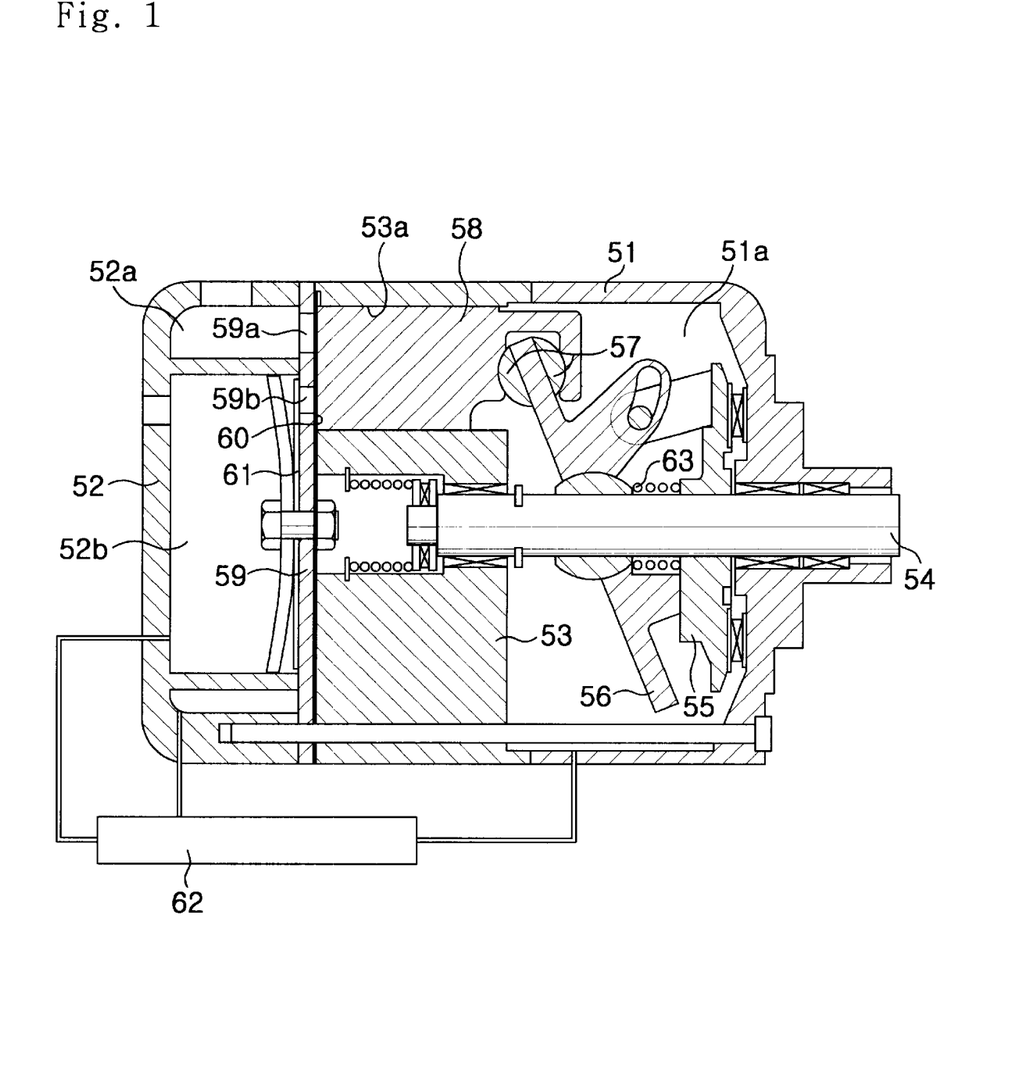
FIG. 1 is a sectional view, showing the construction of a variable displacement swash plate compressor for air conditioning systems of automobiles.

FIG. 1 is a sectional view, showing the construction of a variable displacement swash plate compressor for air conditioning systems of automobiles.

As shown in FIG. 1, the variable displacement swash plate compressor consists of front and rear hermetic housings 51 and 52 forming a sealed cavity therein. A cylinder 53 is positioned within the cavity of the housings 51 and 52. A plurality of bores 53a are regularly formed on the cylinder 53 while being arranged along a circumferential direction of the cylinder 53. A drive shaft 54 is centrally and axially positioned within the front housing 51 and is rotatably supported by the cylinder 53 and the front housing 51 at both ends thereof. A disc-shaped lug plate 55 is fixed to the drive shaft 54, thus being rotatable along with the drive shaft 54. A swash plate 56 is fitted over the drive shaft and is hinged to one end of the lug plate 55, and so the swash plate 56 is rotatable along with the lug plate 55 while axially sliding along the drive shaft 54 with the inclination angle of the swash plate 56 being variable. A plurality of pistons 58 are coupled to the outside edge of the swash plate 56 with a shoe 57 being interposed between the swash plate 56 and each piston 58. When the swash plate 56 is rotated by the engine power, the above pistons 58 rectilinearly reciprocate within the bores 53a of the cylinder 53. A suction lead valve 60 and an exhaust lead valve 61 respectively control the suction port 59a and the exhaust port 59b of a valve plate 59 in accordance with a pressure variation caused by the reciprocating motion of the pistons 58 within the bores 53a. The compressor also comprises a control valve 62. The above control valve 62 controls the pressure within the crank chamber 51a of the front housing 51 in addition to the pressures within the suction chamber 52a and the exhaust chamber 52b of the rear housing 52. The control valve 62 thus finally controls the movement of the pistons 58 within the bores 53a. A coil spring 63 is fitted over the drive shaft 54 at a position between the lug plate 55 and the wobble plate 56, thus elastically biasing the swash plate 56 at a minimum inclination angle when the lug plate 55 is not rotated.

The variable displacement swash plate compressor, having the above-mentioned construction, is operated as follows during a process of compressing gaseous refrigerant flowing from an evaporator prior to feeding the compressed gaseous refrigerant to a condenser.

When the drive shaft 54 is rotated by the engine power, the lug plate 55 of the drive shaft 54 is rotated along with the swash plate 56. Therefore, the pistons 58, provided around the swash plate 56, rectilinearly reciprocate within the bores 53a of the cylinder 53 with the moving distance of the pistons 58 being in proportion to the inclination angle of the swash plate 56. In such a case, when one piston 58 is pulled by the swash plate 56 rearwardly and moves in a rearward direction, the gaseous refrigerant is introduced from the suction chamber 52a into an associated bore 53a through the suction port 59a. When the piston 58 moves from the lower dead point within the bore 53a in a forward direction, the gaseous refrigerant within the bore 53a is compressed, thus being highly pressurized prior to being exhausted into the exhaust chamber 52b through the exhaust port 59. The highly pressurized gaseous refrigerant within the exhaust chamber 52b is, thereafter, fed to the condenser (not shown) through a refrigerant passage.

During the above-mentioned refrigerant compressing process of the compressor, an inertia force acts on the pistons 58, which move within the bores 53a while sucking and exhausting the gas refrigerant relative to the bores 53a. In such a case, the above inertia force acts on the pistons 58 in a direction opposed to the moving direction of the pistons 58 with the strength of the inertia force being in proportion to the weight of the pistons 58. Therefore, when each piston is solid and heavy, the piston undesirably reduces the rotating force of the drive shaft due to an inertia force, thus finally deteriorating the refrigerant compressing efficiency of the compressor. In an effort to overcome the above-mentioned problem derived from heavy solid pistons, a hollow and light piston, shown in FIG. 2, has been proposed and effectively used in a variable displacement swash plate compressor.

Figure 2:
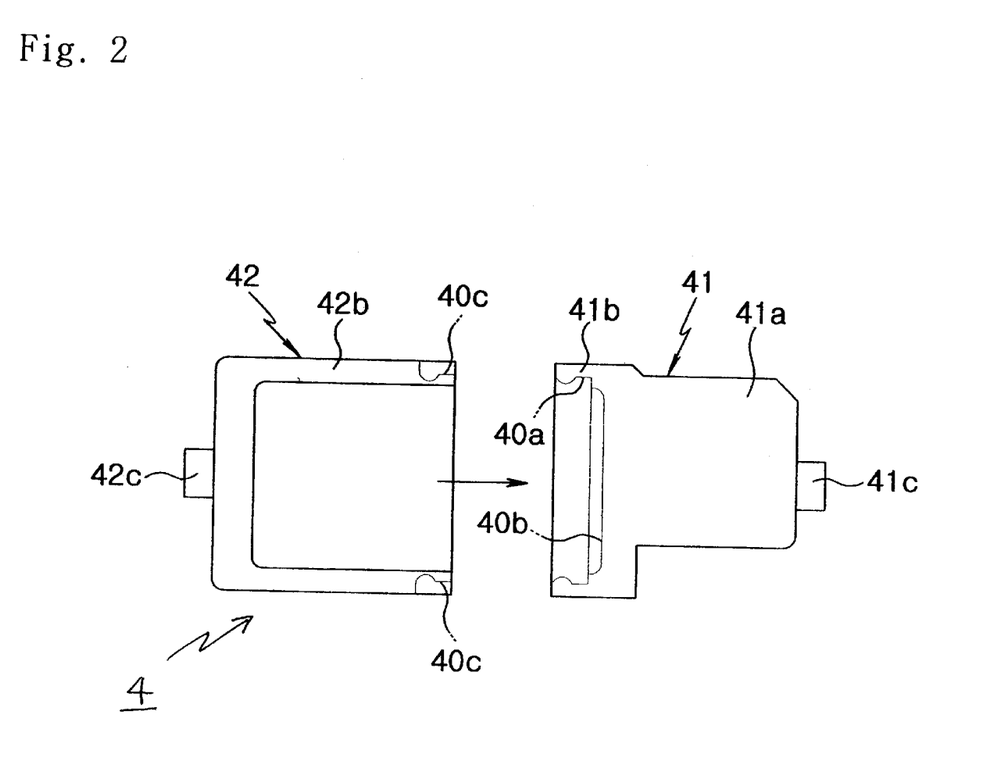
FIG. 2 is a view, showing a body and a cap separately formed through a forging process in a method of manufacturing a hollow piston for variable displacement swash plate compressors.

As shown in FIG. 2, the hollow piston 4 is manufactured by hollowing a cylindrical member. Such a hollow piston 4 is remarkably reduced in weight relative to the volume in comparison with a solid piston, and so the weight proportional inertia force acting on the piston 4 during a movement is very low. Therefore, the hollow piston 4 remarkably improves the refrigerant compressing efficiency of a compressor different from a solid piston, on which a high inertia force acts.

However, the hollow piston is problematic as follows. That is, a solid piston is produced by forming a cylindrical member using a light aluminum material through a forging or die-casting process prior to precisely machining the cylindrical member. However, it is impossible to produce an integrated hollow piston through a die-casting process. Therefore, in order to produce a hollow piston, two members have to be separately formed prior to being integrated into a desired single structure, or a hollow piston. This complicates the process of manufacturing the hollow pistons, and so the process of producing the hollow pistons increases the production cost in addition to a reduction in productivity of the hollow pistons due to an increase in defective proportion of resulting pistons.

Since the hollow pistons have the above-mentioned advantages of remarkably improving the refrigerant compressing efficiency of a compressor, a method of more easily and simply manufacturing such hollow pistons for variable displacement swash plate compressors has been actively studied recently.

Figure 3:
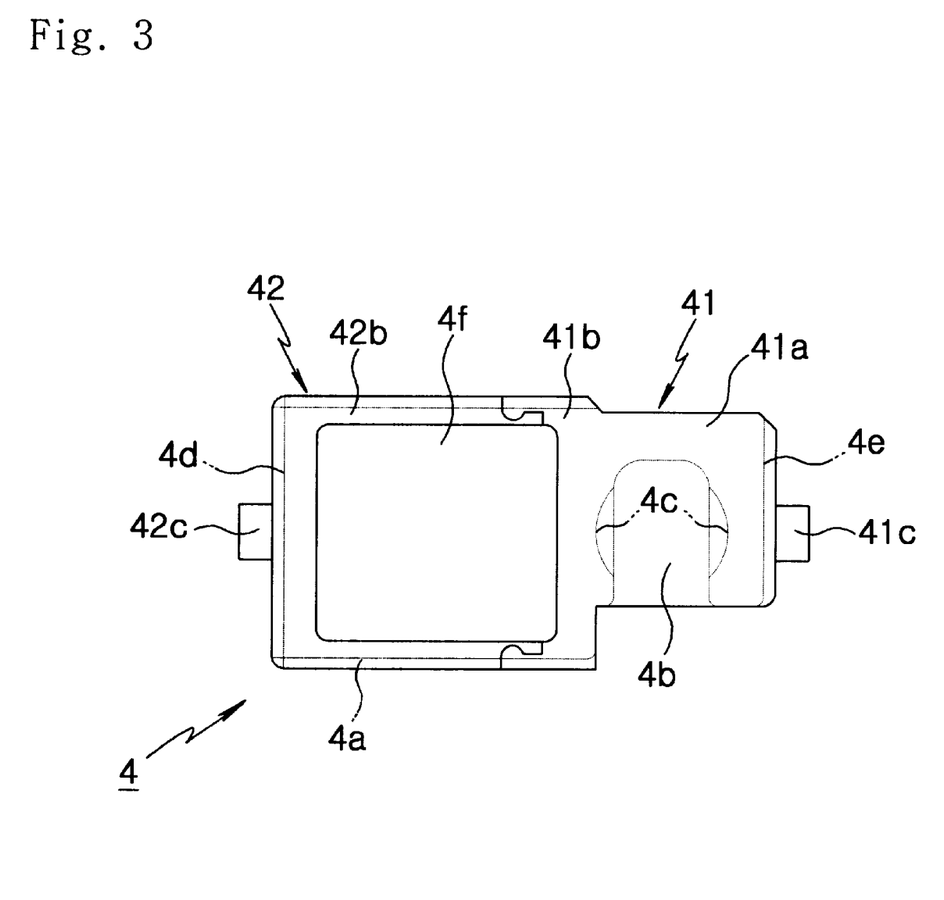
FIG. 3 is a view, showing the body and the cap of FIG. 2 welded together into a piston member through an electron beam welding process in the method.
Figure 4:
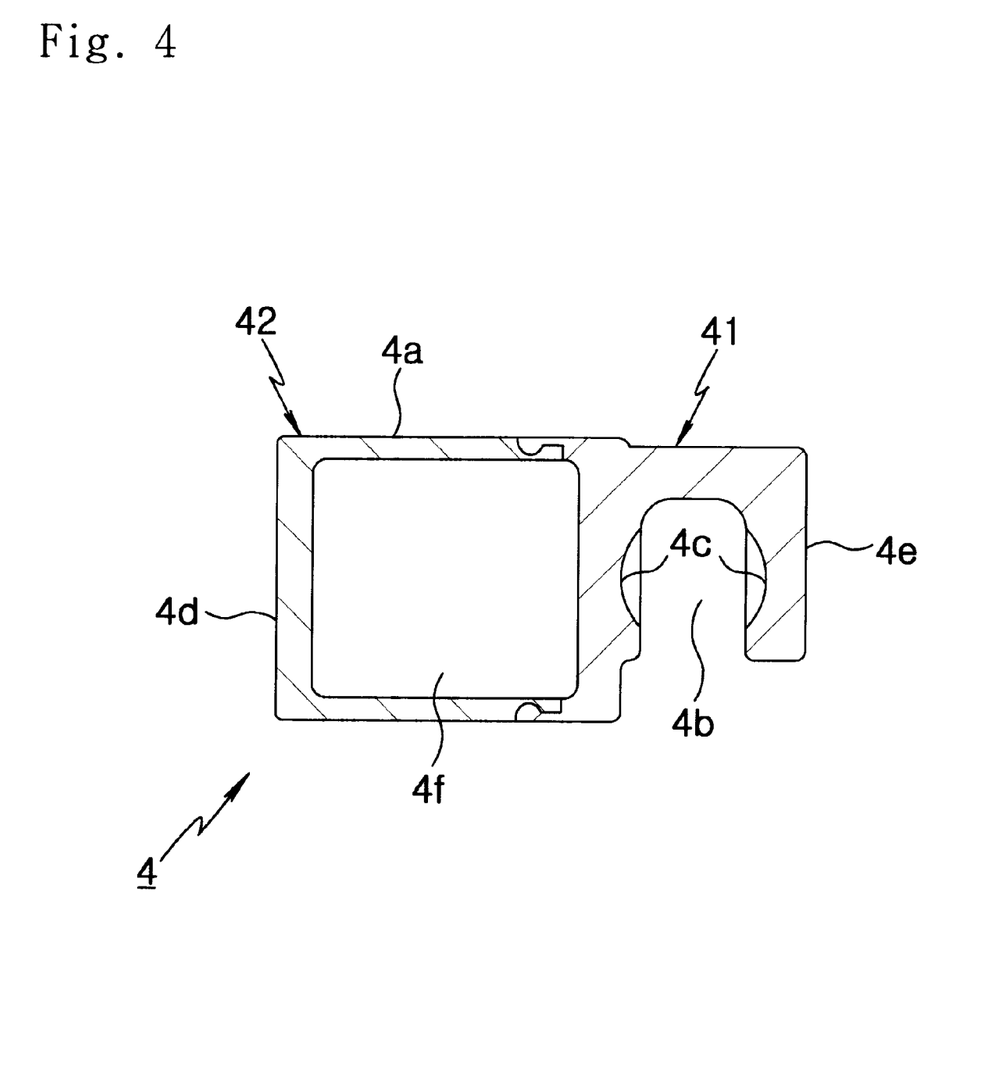
FIG. 4 is a sectional view of a resulting hollow piston manufactured by the method.

A representative example of methods of manufacturing hollow pistons for variable displacement swash plate compressors is shown in FIGS. 2 to 4.

As shown in the drawings, the process of manufacturing a hollow piston 4 is started at a step of separately forming a body 41 and a cap 42. Thereafter, the body 41 and the cap 42 are separately machined prior to being preliminarily assembled into a single body. The preliminarily assembled body 41 and cap 42 are welded together through an electron beam welding process under a vacuum atmosphere, thus forming a desired hollow piston 4. The above process will be described hereinbelow in more detail.

First, a body 41 and a cap 42 are separately produced using an aluminum material through a die-casting or forging process as shown in FIG. 2. In such a case, the body 41 consists of a bridge part 41a, with a head part 41b and a grip part 41c being formed at both sides of the bridge part 41a. The cap 42 consists of a head part 42b and a grip part 42c formed at both sides thereof. This first step is so-called "a forging step". The forging step is followed by a pre-welding machining step. During the pre-welding machining step, the two head parts 41b and 42b of the body 41 and cap 42 are cut at their end surfaces along the dotted lines 40b of FIG. 2, thus forming junction surfaces 40a and 40c at the above end surfaces. Thereafter, the body 41 and the cap 42 are preliminarily assembled together into a single body by forcibly fitting the body 41 into the cap 42 at the junction surfaces 40a and 40c as shown in FIG. 3. The preliminarily assembled body 41 and cap 42 are, thereafter, held by a jig (not shown) prior to being welded together at the surfaces 40a and 40c through an electron beam welding process under a vacuum atmosphere. As a result of such an electron beam welding step, an integrated piston member is provided. The integrated piston member is, thereafter, cut at its side surface through a lather turning process, thus primarily machining the side surface 4a of a piston head. This step is so-called "a post-welding machining step". After the post-welding machining step, a coating step is performed. During the coating step, Teflon is coated on the side surface 4a of the piston member, thus forming an abrasion resistance layer on the piston member. The Teflon-coated side surface 4a of the piston member is, thereafter, subjected to a polishing process. In addition, the bridge part 41a of the body 41 is cut at a predetermined portion, thus forming a swash plate seating recess 4b with a shoe pocket 4c. This step is so-called "a recess cutting step". Finally, the two grip parts 41c and 42c are removed from both ends of the piston member, thereby forming a desired piston 4 having front and rear end surfaces 4d and 4e at both ends thereof as shown in FIG. 4.

In the above process of manufacturing a hollow piston having a cavity 4f, it is necessary to precisely machine the junction surfaces 40a and 40c of the body 41 and cap 42. In addition, the step of welding the body 41 and the cap 42 has to be performed for a relatively long time, or 10 seconds or more. The steps of assembling and machining the body 41 and cap 42 are difficult and complicated, thus complicating the process of manufacturing the hollow piston 4 while reducing productivity and increasing the defective proportion of resulting pistons. Since the electron beam welding step has to be performed under a vacuum atmosphere capable of preventing both the aluminum body 41 and the aluminum cap 42 from oxidizing at their junction surfaces during the welding step, it is necessary to provide expensive equipment designed to perform such a welding process under a vacuum atmosphere. This finally increases the equipment cost while producing the hollow pistons.

Furthermore, the piston 4, produced through the above-mentioned method, has a porous structure with a great number of micro pores formed in the structure during the electron beam welding process. Such micro pores undesirably reduce the durability of the piston 4. The piston 4, with such micro pores, is undesirably impregnated with oil and refrigerant within a compressor, thus causing a shortage of oil or refrigerant in the compressor. Another problem derived from the micro pores resides in that the micro pores cause a leakage of refrigerant between the piston and an associated bore of a cylinder. When such micro pores are formed to completely penetrate through the sidewall of the hollow piston, refrigerant and/or oil may be undesirably filled in the cavity 4f of the piston, thus making the piston 4 heavier and seriously reducing the operational efficiency of a compressor.

FIGS. 5 to 9 are views, showing a method of manufacturing a hollow piston for variable displacement swash plate compressors in accordance with the primary embodiment of the present invention.

As shown in the drawings, the method of manufacturing a hollow piston according to the primary embodiment comprises the first step of separately forming a body 11 and a cap 12. In the method, a frictional welding step of welding the body 11 and the cap 12 into a piston member under atmospheric air at room temperature is performed after the forging step. The method also comprises a pre-welding machining step of cutting the piston member before the frictional welding step and a post-welding machining step of cutting the piston member after the frictional welding step, thus producing a desired hollow piston 1. The method according to the primary embodiment is started at a forging step of separately forming the body 11 and the cap 12.

Figure 5:
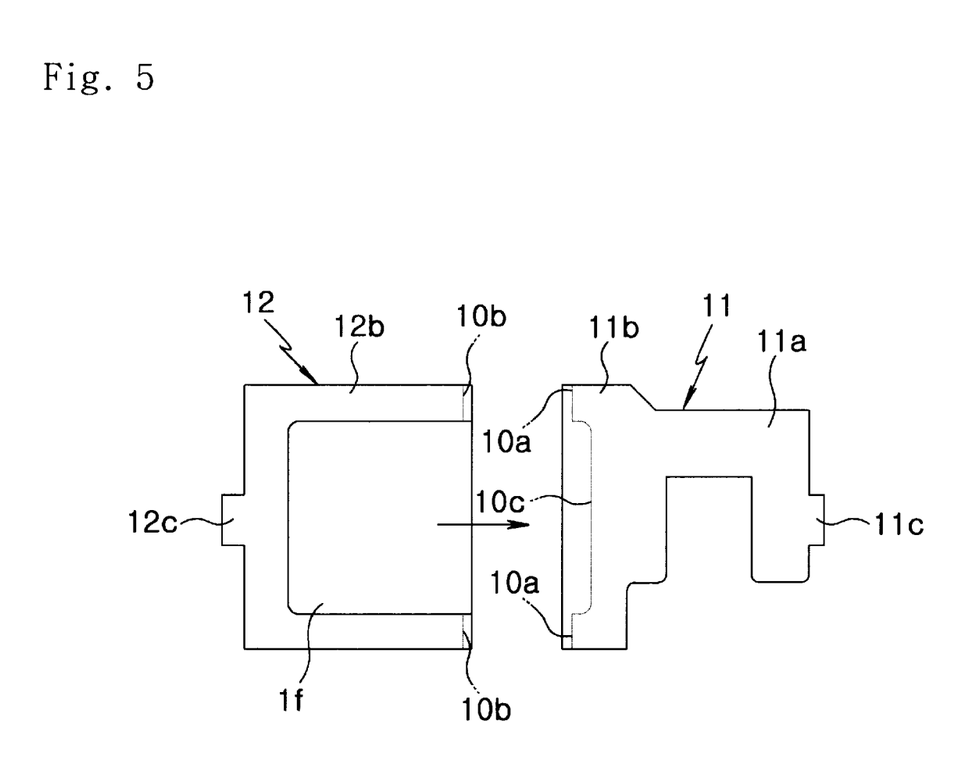
FIG. 5 is a view, showing a body and a cap separately formed through a forging process in a method of manufacturing a hollow piston for variable displacement swash plate compressors in accordance with the primary embodiment of the present invention.

FIG. 5 shows the body 11 and the cap 12 separately formed through a forging process in the method of the primary embodiment of the present invention.

As shown in FIG. 5, the body 11 and the cap 12 are separately produced using an aluminum material through a die-casting or forging process. In such a case, the body 11 consists of a bridge part 11a, with a hollow cylindrical head part 11b and a grip part 11c being formed at both sides of the bridge part 11a. The cap 12 consists of a hollow cylindrical head part 12b and a grip part 12c formed at both sides thereof. In the forging step, it is necessary to form the body 11 and the cap 12 while making them thick enough to have an appropriate machining allowance.

The forging step is followed by a pre-welding machining step. During the pre-welding machining step, the two head parts 11b and 12b of the body 11 and the cap 12 are cut at their end surfaces along the dotted lines of FIG. 5, thus forming junction surfaces 10a and 10b at the above end surfaces. In this pre-welding machining step, both the body 11 and the cap 12 are appropriately cut through a simple planing process. This planing process accomplishes both flatness and surface roughness of the junction surfaces 10a and 10b and allows the body 11 and the cap 12 to be easily welded together in the continued frictional welding step. Such a simple planing process remarkably simplifies the pre-welding machining step of this invention in comparison with the pre-welding machining step of a conventional method, thus desirably reducing the defective proportion and the production cost of resulting pistons. When the end surface of the head part 11b of the body 11 is concavely cut along the dotted line 10c of FIG. 5 during the pre-welding machining step, it is possible to enlarge the size of the cavity 1f and to further lighten the resulting piston 1.

Figure 6:
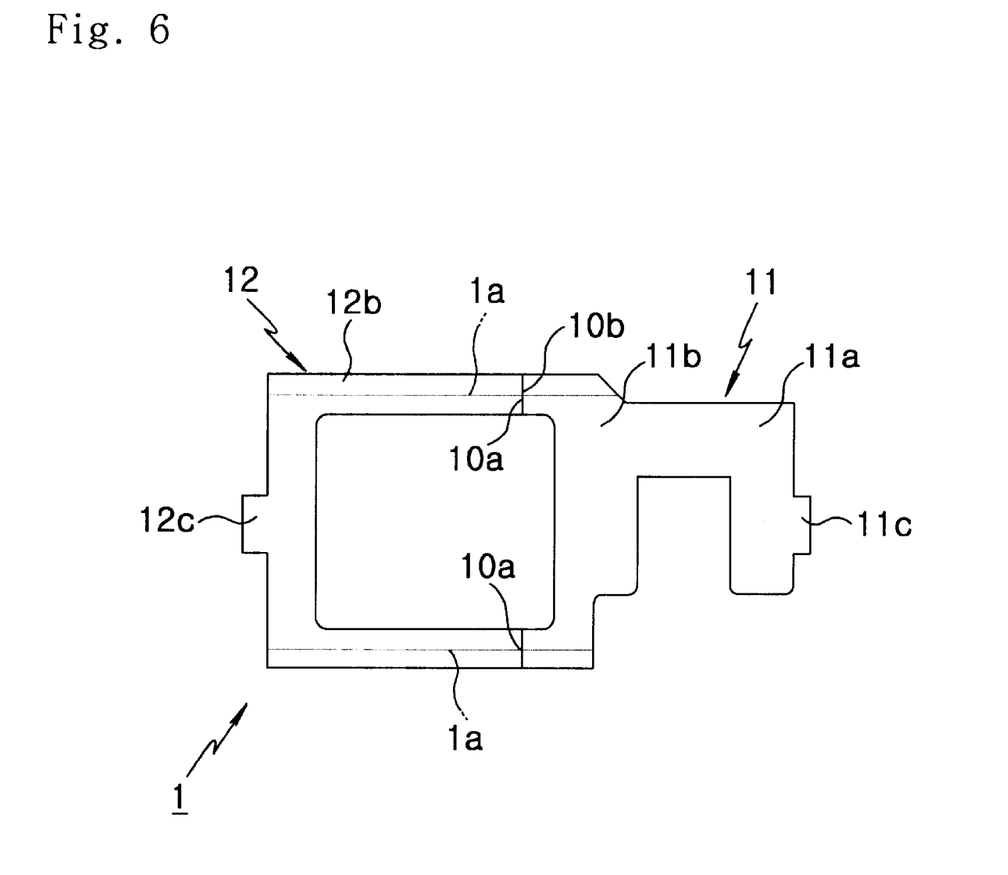
FIG. 6 is a view, showing the body and the cap of FIG. 5 welded together into a piston member through a frictional welding process in the method of this invention.

FIG. 6 shows a frictional welding process for the body 11 and the cap 12 of FIG. 5. In the frictional welding process, the body 11, with the junction surface 10a, and the cap 42, with the junction surface 10b, are primarily held by jigs (not shown) at their grip parts 11c and 12c. Thereafter, the body 11 and the cap 12 are rotated in opposite directions while being forced toward each other, and so they are welded together into a piston member at the junction surfaces 10a and 10b due to frictional heat generated at the junction surfaces 10a and 10b. Such a frictional welding process results in a high integration strength at the junction surfaces 10a and 10b and accomplishes a desired welding effect by simply rotating the body 11 and the cap 12 in opposite directions under atmospheric air at room temperature. Therefore, it is possible to perform the frictional welding process using a simple welding machine, which is only designed to rotate the body 11 and the cap 12 in opposite directions while forcing them toward each other. This frictional welding process thus remarkably reduces the equipment cost of the method in comparison with a conventional electron beam welding process, which has to be performed under a vacuum atmosphere. The frictional welding process of this invention also consumes about 5 seconds to completely weld the body 11 and the cap 12 into a single structure. This frictional welding process thus remarkably reduces the processing time and remarkably improves productivity while producing the hollow pistons in comparison with the conventional electron beam welding process consuming about 10 seconds.

In the frictional welding step, it is preferable to make the desired frictional heat between the junction surfaces 10a and 10c of the body 11 and the cap 12 as follows. That is, the frictional heat may be generated due to a difference in relative speeds of the body 11 and the cap 12 by stopping either the body 11 or the cap 12 after rotating them at the same time in the same direction while forcing them toward each other. Alternatively, the frictional heat between the junction surfaces 10a and 10c may be generated by rotating either the body 11 or the cap 12 while forcing them toward each other and holding still a remaining one of the body 11 and the cap 12.

In the post-welding machining step, the integrated piston member from the frictional welding process is cut at its side surface through a lather turning process while being firmly held by a jig (not shown), thus forming the side surface 1a of a piston head as shown by the dotted line of FIG. 6.

After the post-welding machining step, a coating step is performed. During the coating step, an abrasion resistance layer is coated on the side surface 1a of the piston member. The abrasion resistance layer is formed using a lubricant abrasion resistance material, such as Teflon, and remarkably improves the abrasion resistance of a resulting piston 1 and lengthens the expected life span of the piston 1. Such an abrasion resistance layer also removes the micro pores from the structure of the piston, thus allowing the piston to be free from reducing the refrigerant compressing efficiency of a compressor due to such micro pores.

Thereafter, a polishing process is performed. In the polishing process, the side surface 1a of the piston head is polished, thus having a desired surface roughness capable of minimizing the frictional force between the resulting piston 1 and an associated bore of a cylinder.

The polishing process is followed by a recess cutting step. In the recess cutting step, the bridge part 11a of the piston member is cut at a predetermined portion, thus forming a swash plate seating hole 1b with a shoe seat 1c as shown by the phantom line of FIG. 7. In such a case, the swash plate seating recess 1b seats a swash plate 56 (see FIG. 1) therein, while the shoe pocket 1c seats a shoe 57 (see FIG. 1) therein.

Figure 7:
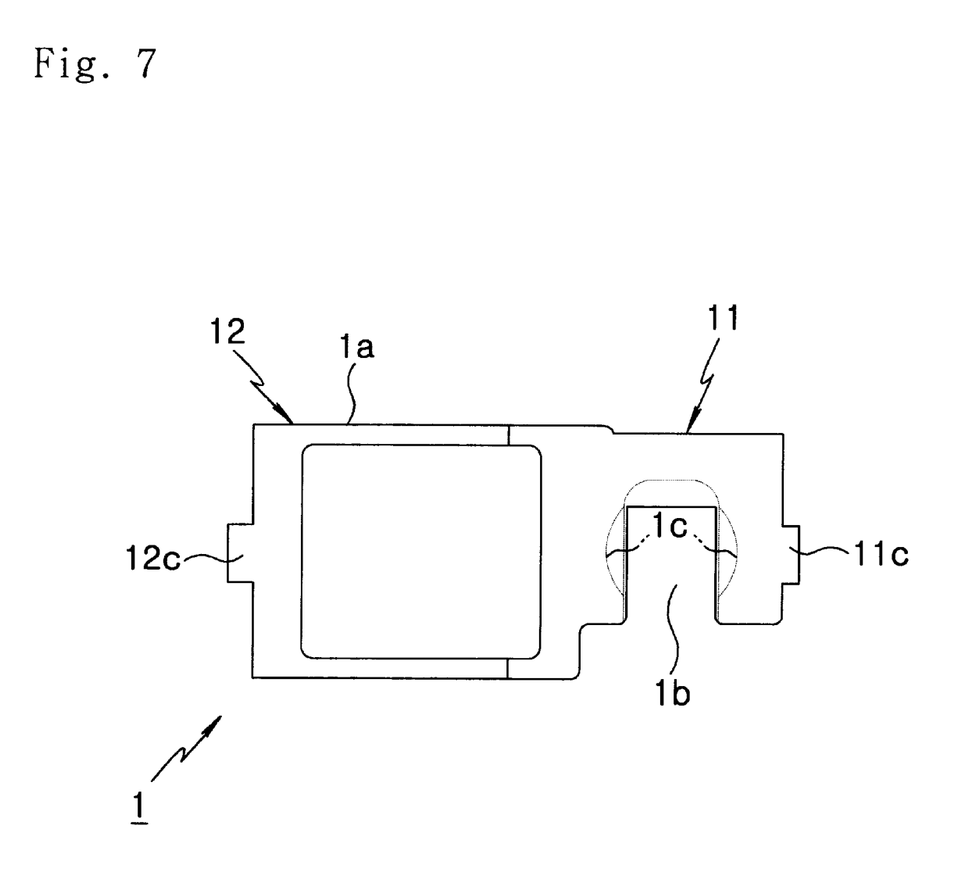
FIG. 7 is a sectional view of the piston member of FIG. 6, with the side surface of a head part being cut through a post-welding machining process.
Figure 8:
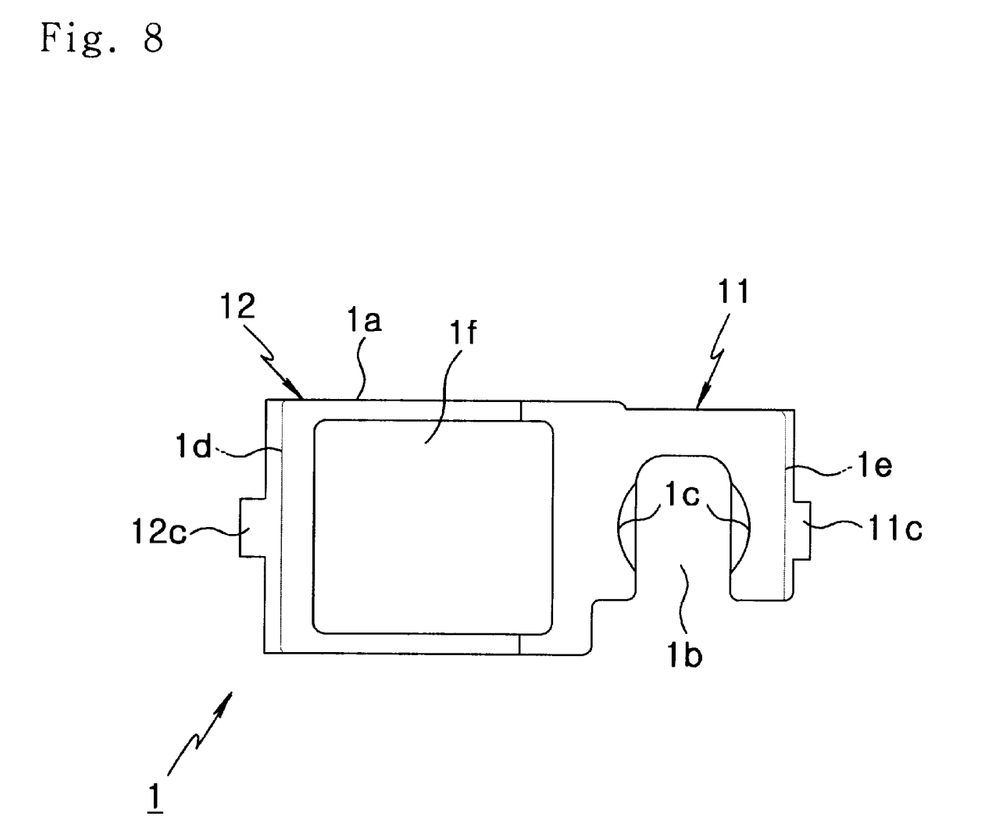
FIG. 8 is a sectional view of the piston member of FIG. 6, with the side surface of the head part being polished through a polishing process.
Figure 9:
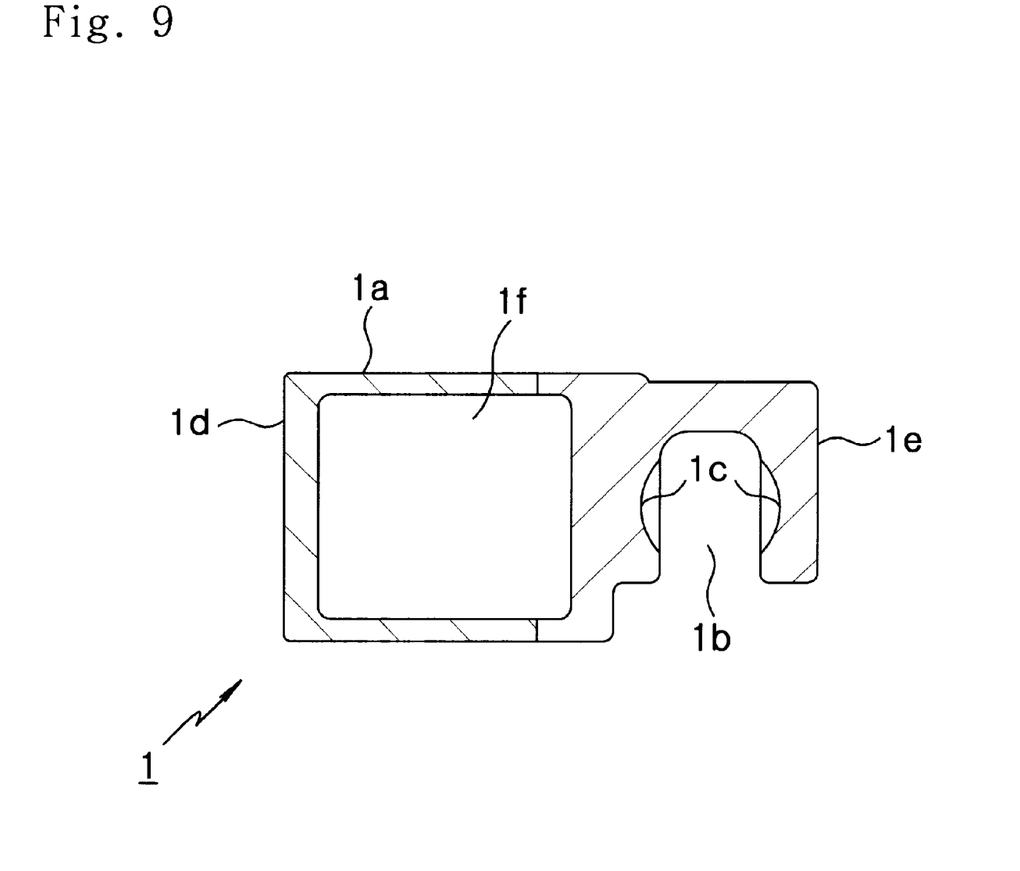
FIG. 9 is a sectional view of a resulting hollow piston manufactured by the method according to the primary embodiment of this invention.

The above shoe pocket 1c is formed by cutting the sidewall of the swash plate recess hole 1b at diametrically opposite portions so as to form concave surfaces at the portions. As well known to those skilled in the art, the shoe 57, interposed between the swash plate 56 and the seating recess 1b, reduces the frictional force between the recess plate 56 and the seating recess 1b and absorbs a displacement of the inclination angle of the swash plate 56 during an operation of a compressor.

Thereafter, a final cutting step is performed. In the final cutting step, the two grip parts 11c and 12c are removed from both ends of the piston member by cutting the piston member along the dotted lines of FIG. 8. A desired hollow piston 1, having front and rear end surfaces 1d and 1e at both ends, is thus formed. When the hollow piston 1 is received into a bore 53a (see FIG. 1) of a cylinder, the piston 1 is smoothly slidable within the bore of the cylinder in opposite directions with the front end surface 1d acting as a refrigerant compressing surface and the side surface 1a of the piston head being almost free from forming a frictional force between the piston and the bore.

As described above, the method according to the primary embodiment of this invention produces a desired hollow piston 1 by separately forming a body 11 and a cap 12 through a forging process and by somewhat simply and roughly machining the body 11 and the cap 12, and by welding them together through a frictional welding process. The method of this invention thus remarkably simplifies the post-welding machining process for the body 11 and the cap 12. In the method of this invention, the frictional welding step of integrating the body 11 and the cap 12 into a single structure is accomplished by simply and relatively rotating the body 11 and the cap 12 under atmospheric air at room temperature. Such a frictional welding process thus allows a welding machine having a simple construction to be usable in the method, thus effectively reducing the equipment cost of the method.

The above-mentioned advantages of this method are particularly prominent when the method of this invention is compared with a conventional method. That is, in the conventional method, it is necessary to precisely machine the body 41 and the cap 42 so as to form preliminary assembling structures (shown by the dotted lines of FIG. 2) on the body 41 and the cap 42 prior to welding the body 41 and the cap 42 together through an electron beam welding process. In addition, the electron beam welding process of the conventional method has to be performed using an electrode welding rod under a vacuum atmosphere so as to prevent the body 41 and the cap 42, both being made of an aluminum material, from being undesirably oxidized at their welded portions. Such an electron beam welding process thus requires a complex welding machine. The frictional welding process of this invention overcomes the problems derived from the electron beam welding process.

The frictional welding process of this invention is also free from forming micro pores in the piston since the frictional welding process does not cause any oxidization at the welded portions. The method of this invention thus produces hollow pistons having a high durability and being free from a reduction in refrigerant compressing efficiency of a compressor. The frictional welding process of this invention is simply accomplished within about 5 seconds, thus remarkably reducing the defective proportion of resulting pistons and remarkably improving productivity while producing the pistons.

Figure 10:
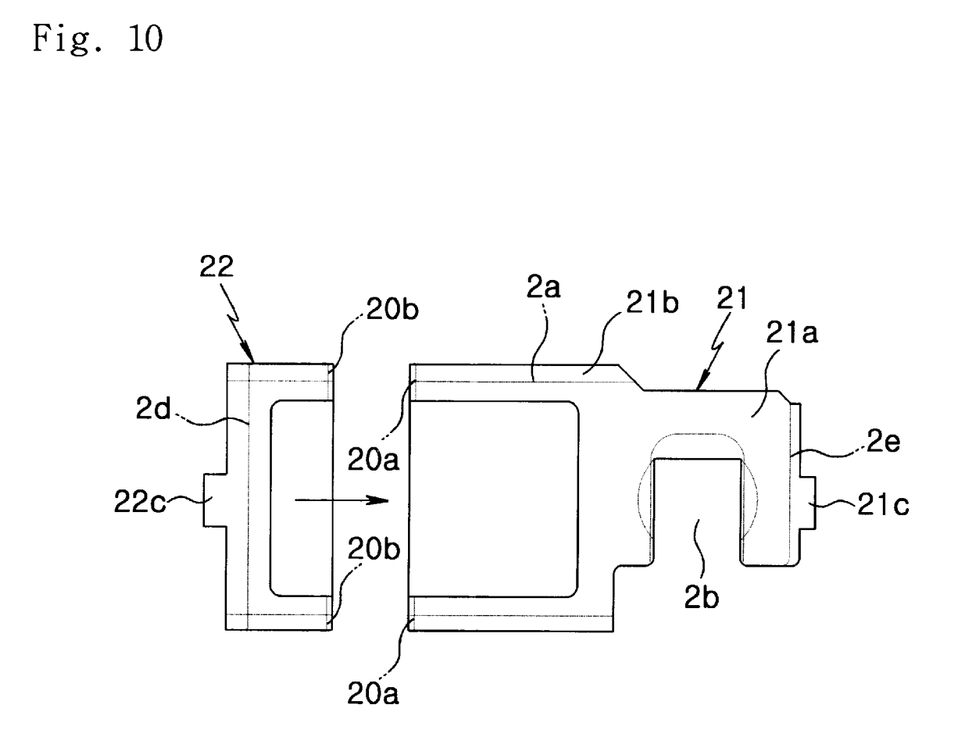
FIG. 10 is a view, showing a body and a cap separately formed in a method of manufacturing a hollow piston for variable displacement swash plate compressors in accordance with the second embodiment of the present invention.
Figure 11:
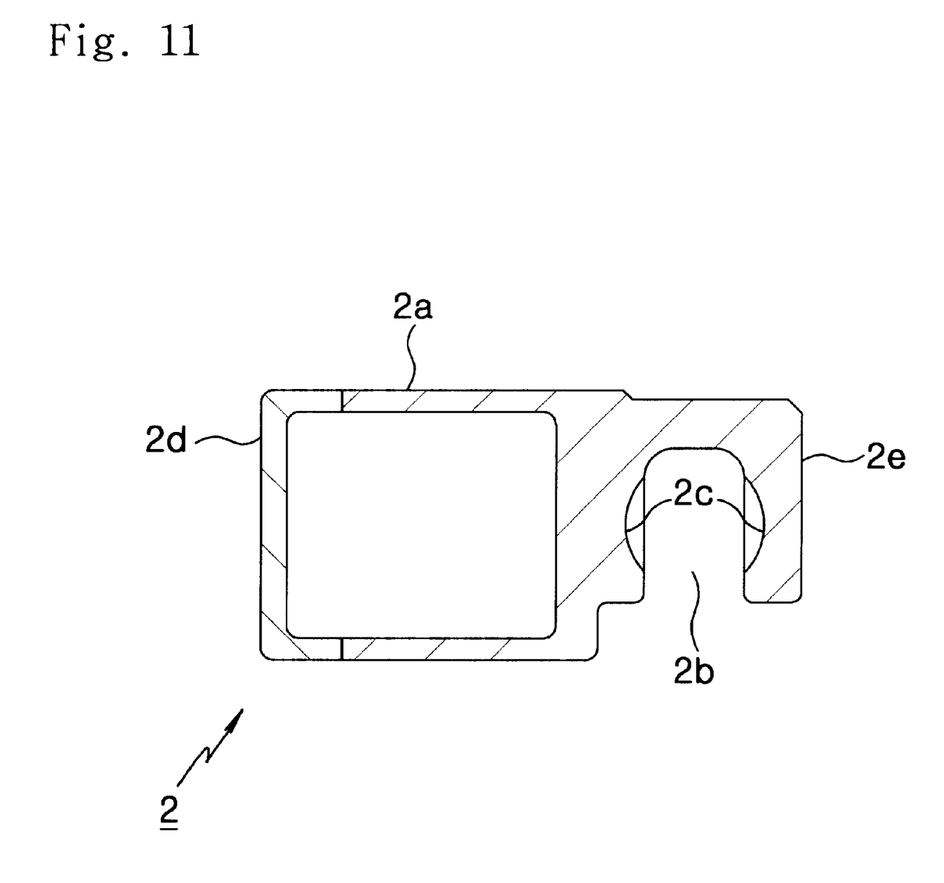
FIG. 11 is a sectional view of a resulting hollow piston manufactured by the method according to the second embodiment of this invention.
Figure 12:
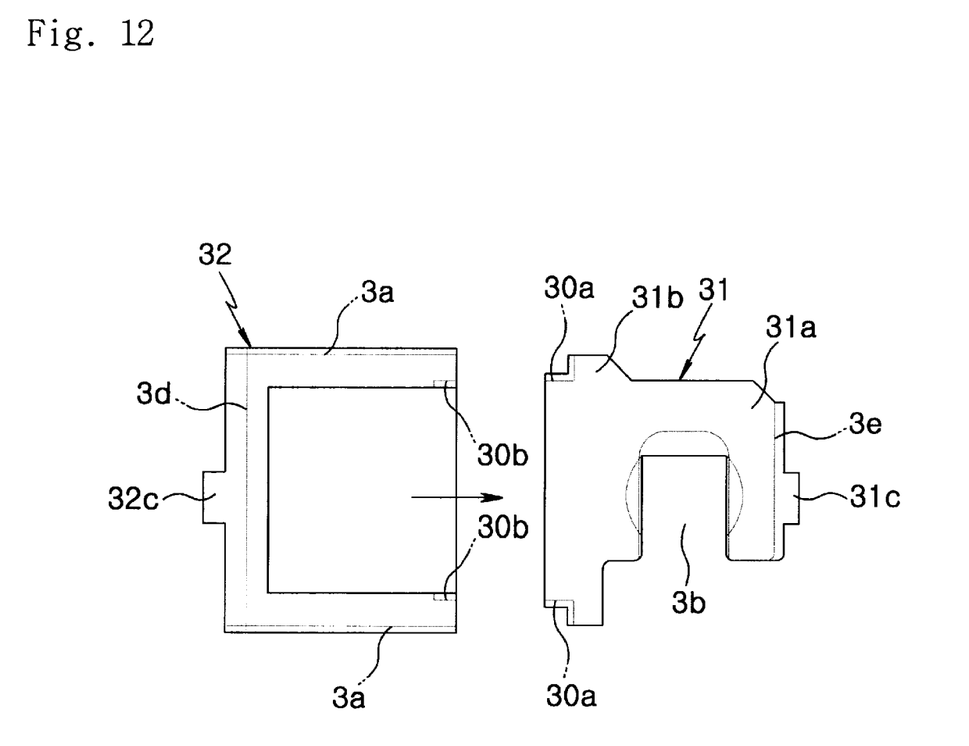
FIG. 12 is a view, showing a body and a cap separately formed in a method of manufacturing a hollow piston for variable displacement wobble plate compressors in accordance with the third embodiment of the present invention.
Figure 13:
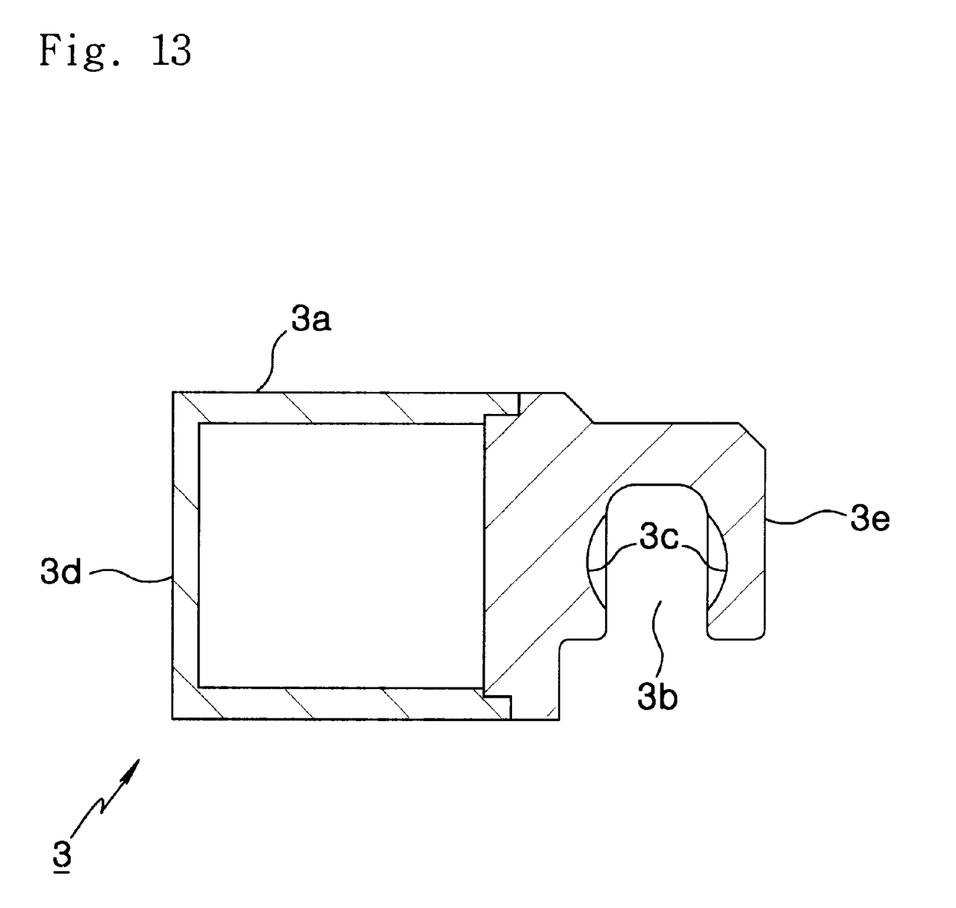
FIG. 13 is a sectional view of a resulting hollow piston manufactured by the method according to the third embodiment of this invention.

FIGS. 10 and 11 show a method of manufacturing a hollow piston in accordance with the second embodiment of this invention. FIGS. 12 and 13 show a method of manufacturing a hollow piston in accordance with the third embodiment of this invention.

In the second embodiment of this invention of FIGS. 10 and 11, most steps of the method remain the same as those of the primary embodiment of FIGS. 5 to 9, but the body 21 and the cap 22 of this second embodiment are different from those of the primary embodiment in a split ratio at their head parts as best seen in FIGS. 5 and 10.

In the method of the second embodiment of this invention, a body 21 is formed through a forging process, with the head part 21b of the body 21 being longer than the head part 11b of the body 11 according to the primary embodiment. In addition, a cap 22 is formed through a forging process, with the head part 22b of the cap 22 being shorter than the head part 21b of the body 21 or than the head part 12b of the cap 12 according to the primary embodiment. Of course, it should be understood that the body 21 and the cap 22 may be formed with the head part 21b of the body 21 being shorter than the head part 22b of the cap 22 even though this modification is not shown in the preferred embodiments. The body 21 and the cap 22 are, thereafter, cut at the end surfaces of their head parts 21b and 22b while being held by jigs (not shown) having different sizes. Junction surfaces 20a and 20b are thus formed at the end surfaces of the head parts 21b and 22b. The body 21 and the cap 22 are, thereafter, integrated into a piston member through a frictional welding process under atmospheric air at room temperature. After the frictional welding process, the piston member is primarily cut through a post-welding machining step, thus forming the side surface 2a of a piston head. Thereafter, a coating step is performed to form an abrasion resistance layer on the side surface 2a. The coating step is followed by a polishing step, wherein the side surface 2a is polished. Thereafter, the same hole cutting step and the same final cutting step as those of the primary embodiment are performed to form a swash plate seating recess 2b with a shoe pocket 2c on a predetermined portion of the piston member and to remove the two grip parts 21c and 22c from both ends of the piston member. A desired hollow piston 2, having front and rear end surfaces 2d and 2e at both ends, is thus produced.

The method according to the second embodiment of the invention yields the same advantages as those expected from the method according to the primary embodiment.

In the third embodiment of this invention of FIGS. 12 and 13, the body 31 and the cap 32, formed through a forging process or a die-casting process, are appropriately cut at the end surface of a solid cylindrical fitting end part 31b of the body 31 and at the hollow cylindrical head part 32b of the cap 32, thus forming stepped junction surfaces 30a and 30b at the end surfaces of the parts 31b and 32b. In this embodiment, the junction surface 30a of the body 31 has a bossed profile, while the junction surface 30b of the cap 32 has a recessed profile substantially encountering the bossed profile of the junction surface 30a. That is, the two junction surfaces 30a and 30b form a fitting structure for the body 31 and the cap 32. The body 31 and the cap 32 are, thereafter, welded together into a piston member through a frictional welding process. In the frictional welding process, the body 31 and the cap 32 are relatively rotated while being forced toward each other with the solid cylindrical fitting end part 31b of the body 31 being fitted into the hollow cylindrical head part 32b of the cap 32, thus being welded together due to frictional heat generated at the junction surfaces 30a and 30b. After the frictional welding process, the piston member is subjected to the same post-welding machining step, the same coating step, the same polishing step, the same recess cutting step and the same final cutting step as those of the primary and second embodiments. Thus, a desired hollow piston 3, which has a side surface 3a, a swash plate seating recess 3b with a shoe pocket 3c, and front and rear end surfaces 3d and 3e, is produced.

The resulting hollow piston 3 produced by the method of the third embodiment is somewhat reduced in the integration strength at the welded junction surfaces between the body 31 and the cap 32 in comparison with the hollows pistons 1 and 2 produced by the methods of the primary and second embodiments. However, the fitting structures, formed by the junction surfaces 30a and 30b of the piston 3 according to the third embodiment, somewhat effectively compensate for such a reduction in the integration strength.

As described above, the present invention provides a method of manufacturing a hollow piston for variable displacement swash plate compressors of air conditioning systems. The method of this invention produces a desired hollow piston by separately forming a body and a cap and by simply machining the body and the cap prior to simply welding the body and the cap together into a single structure through a frictional welding process under atmospheric air at room temperature. The method of this invention thus remarkably simplifies the pre-welding machining process. In the frictional welding process of this invention, the body and the cap are welded together into a single structure by simply and relatively rotating the body and the cap while forcing them toward each other under atmospheric air at room temperature. Therefore, the frictional welding process is accomplished using a simple welding machine, and so the method of this invention reduces the equipment cost.

In the method of this invention, the frictional welding process accomplishes a high integration strength of a resulting piston. Such a frictional welding process is also free from oxidizing the welded portions of the resulting piston, and so the resulting piston does not have micro pores in its structure. Therefore, the method of this invention produces hollow pistons, which have a high durability and are free from reducing the refrigerant compressing efficiency of a compressor different from the hollow pistons produced by a conventional method. In addition, the frictional welding process of this invention is a simple process consuming about 5 seconds to completely weld the body and the cap into a single structure. This frictional welding process thus remarkably reduces the defective proportion of resulting pistons and remarkably improves productivity while producing the hollow pistons. This finally reduces the production cost of such hollow pistons.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a hollow piston for variable displacement swash plate compressors, comprising:

separately forming a body and a cap, said body comprising a bridge part, with a hollow cylindrical head part and a grip part being formed at both sides of said bridge part, and said cap comprising a hollow cylindrical head part and a grip part formed at both sides thereof;

cutting end surfaces of said head parts of both the body and the cap, thus forming junction surfaces at said end surfaces of the head parts;

integrating the body and the cap into a piston member by frictionally welding the junction surfaces together while forcing the body and the cap toward each other with the body and the cap being held by jigs at their grip parts;

cutting a side surface of said piston member while holding the piston member using a jig, thus primarily forming a side surface of a piston head;

forming an abrasion resistance layer on said side surface of the piston head;

polishing the side surface of the piston head, thus finally forming a desired side surface of the piston head;

cutting said bridge part of the body of the piston member at a predetermined portion, thus forming a swash plate seating recess with a shoe recess, said shoe pocket being formed by cutting a sidewall of the swash plate seating recess at diametrically opposite portions so as to form concave surfaces at said diametrically opposite portions; and removing the grip parts from both ends of the piston member, thus forming front and rear end surfaces of a resulting piston.

2. The method according to claim 1, wherein said integrating the body and the cap is performed under atmospheric air at room temperature.

3. The method according to claim 1, wherein said integrating the body and the cap is accomplished by frictional heat generated at said junction surfaces by stopping either the body or the cap after rotating them at the same time in the same direction while forcing them toward each other.

4. The method according to claim 1, wherein said integrating the body and the cap is accomplished by frictional heat generated at said junction surfaces by rotating either the body or the cap while forcing them toward each other and holding still a remaining one of the body and the cap.

5. The method according to claim 1, wherein said junction surfaces are formed on the body and the cap through a planing process.

6. The method according to claim 1, wherein said head part of the body is longer than the head part of said cap.

7. The method according to claim 1, wherein said head part of the body is shorter than the head part of said cap.

8. The method according to claim 7, wherein said end surface of the head part of the body is concavely cut during the cutting end surfaces of said head parts, thus enlarging a cavity of the resulting piston.

9. A method of manufacturing a hollow piston for variable displacement swash plate compressors, comprising:

separately forming a body and a cap, said body comprising a bridge part, with a solid cylindrical fitting end part and a grip part being formed at both sides of said bridge part, and said cap comprising a hollow cylindrical head part and a grip part formed at both sides thereof;

cutting the solid cylindrical fitting end part of said body at its end and external surfaces and of cutting an end surface of the head part of said cap, thus forming junction surfaces at the solid cylindrical fitting end part of the body and at the end surface of the head part of said cap;

integrating the body and the cap into a piston member by frictionally welding the junction surfaces to each other while forcing the body and the cap toward each other, with the solid cylindrical fitting end part of said body being fitted into the hollow cylindrical head part of the cap and both the body and the cap being held by jigs at their grip parts;

cutting a side surface of said piston member while holding the piston member using a jig, thus primarily forming a side surface of a piston head;

forming an abrasion resistance layer on said side surface of the piston head;

polishing the side surface of the piston head, thus finally forming a desired side surface of the piston head;

cutting said bridge part of the body of the piston member at a predetermined portion, thus forming a swash plate seating hole with a shoe recess, said shoe pocket being formed by cutting a sidewall of the swash plate seating hole at diametrically opposite portions so as to form concave surfaces at said diametrically opposite portions; and removing the grip parts from both ends of the piston member, thus forming front and rear end surfaces of a resulting piston.

* * * * *